Patented Aug. 26, 1952

2,608,578

UNITED STATES PATENT OFFICE 2,608,578

DI(ALKYL GLYCOLYL) ESTERS OF OXY-DI-(POLYMETHYLENE)-DICARBOXYLIC ACIDS

William E. Weesner, Webster Groves, Mo., assignor to Monsanto Chemical Company, St. Louis, Mo., a corporation of Delaware No Drawing. Application June 10, 1949, Serial No. 98,398

8 Claims. (Cl. 260—484)

This invention relates to di(alkyl glycolyl) esters of oxy - di(polymethylene) - dicarboxylic acids having the formula

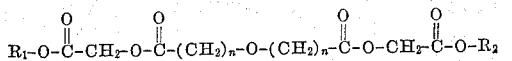

wherein $R_1$ and $R_2$ represent an alkyl radical having from 1 to 18 carbon atoms or an alkoxyethyl radical wherein the alkyl group contains from 1 to 12 carbon atoms, and $n$ is a whole number from 1 to 3 inclusive.

The novel di(alkyl glycolyl) esters of oxy-di(polymethylene)-dicarboxylic acids of this invention range in appearance from essentially clear, colorless, mobile liquids to relatively low melting solids. They have been found to have exceptional utility as plasticizers and extenders for various natural and synthetic resins, and in particular polyvinyl chloride resins and copolymers containing predominantly combined vinyl chloride as exemplified by copolymers containing 85 to 95% by weight of vinyl chloride and 5 to 15% by weight of vinyl acetate, vinylidene chloride, diethyl maleate, diethyl fumarate or methyl methacrylate.

Various procedures may be utilized in preparing the novel compounds of this invention. Thus, they may be prepared by the direct esterification of an oxy-di(polymethylene)-dicarboxylic acid having the formula

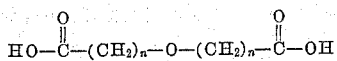

wherein $n$ is a whole number from 1 to 3 inclusive, with approximately 2 molecular proportions of an alkyl glycolate wherein the alkyl substituent is an alkyl radical containing from 1 to 18 carbon atoms or an alkoxyethyl radical wherein the alkyl group contains from 1 to 12 carbon atoms, in the presence of an acidic catalyst, such as sulfuric acid or toluene sulfonic acid. Preferably, however, these novel compounds are prepared by reacting approximately 2 molecular proportions of an alkyl chloroacetate wherein the alkyl radical contains from 1 to 18 carbon atoms or 2 molecular proportions of an alkoxyethyl chloroacetate, wherein the alkyl substituent contains from 1 to 12 carbon atoms with a 1 molecular proportion of a di(alkali metal) salt of an oxy-di(polymethylene)-dicarboxylic acid having the formula

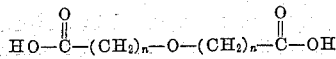

wherein $n$ is a whole number from 1 to 3 inclusive, at a maximum temperature of about 200° C.

It is also preferable that this latter reaction be carried out in the presence of catalytic quantities of a tertiary amine catalyst, such as triethylamine or dimethyl cyclohexylamine.

If in the above described process there is utilized in place of the 2 molecular proportions of an alkyl glycolate or 2 molecular proportions of an alkoxyethyl glycolate, 2 molecular proportions of a mixture of dissimilar alkyl glycolates, or dissimilar alkoxyethyl glycolates or a mixture of an alkyl glycolate and an alkoxyethyl glycolate, the reaction mass then obtained will contain a mixture of two different di(alkyl glycolyl) esters of an oxy-di(polymethylene)-dicarboxylic acid and an unsymmetrical di(alkyl glycolyl) ester of an oxy - di(polymethylene) - dicarboxylic acid, which mixture may then be separated into its three components by means of fractional distillation.

Typical of the novel esters of this invention are the di(methyl glycolyl), di(ethyl glycolyl), di(propyl glycolyl), di(isopropyl glycolyl), di(butyl glycolyl), di(isobutyl glycolyl), di(pentyl glycolyl), di(hexyl glycolyl), di(2-methylpentyl glycolyl), di(heptyl glycolyl), di(n-octyl glycolyl), di(capryl glycolyl), di(2-ethylhexyl glycolyl), di(6 - methylheptyl glycolyl), di(nonyl glycolyl), di(trimethylhexyl glycolyl), di(decyl glycolyl), di(trimethylheptyl glycolyl), di(undecyl glycolyl), di(dodecyl glycolyl), di(tridecyl glycolyl), di(tetradecyl glycolyl), di(pentadecyl glycolyl), di(hexadecyl glycolyl), di(heptadecyl glycolyl), di(octadecyl glycolyl), di(methoxyethyl glycolyl), di(ethoxyethyl glycolyl), di(propoxyethyl glycolyl), di(isopropoxyethyl glycolyl), di(butoxyethyl glycolyl), di(isobutoxyethyl glycolyl), di(pentoxyethyl glycolyl), di(2-methylpentoxyethyl glycolyl), di(hexoxyethyl glycolyl), di(heptoxyethyl glycolyl), di(octoxyethyl glycolyl), di(2-ethylhexoxyethyl glycolyl), di(6-methylheptoxyethyl glycolyl), di(nonoxyethyl glycolyl), di(decoxyethyl glycolyl), di(undecoxyethyl glycolyl), di(dodecoxyethyl glycolyl), esters of diglycolic, β-oxy-dipropionic and γ-oxy-dibutyric acids.

The following examples are illustrative of the manner of preparation of the novel esters of this invention and their physical properties:

EXAMPLE I

Di(butyl glycolyl) diglycolate

In a glass reactor, 180.6 g. of butyl chloroacetate and 2.0 ml. of triethylamine were heated with stirring to 100° to 110° C. and then about 89.0 g. of disodium diglycolate was added. After all of the reactants had been added, the mass was heated to about 140° to 165° C. for 18 hours. At the end of the reaction period, the oil was washed with water and sodium carbonate to remove alkali soluble impurities, steamed to remove any excess butyl chloroacetate, treated to improve color and dried under vacuum. Di(butyl glycolyl) diglycolate thus obtained had the following properties:

Sp. gr. 25°/25° C. _____ 1.1362
$N_D^{25°}$ _____ 1.4465

EXAMPLE II

Di(butyl glycolyl) γ-oxy-dibutyrate 117 g. of disodium γ-oxy-dibutyrate was added to 150.5 g. of butyl chloroacetate and 1.01 ml. of triethylamine. After all of the reactants had been added, the mixture was heated to 150° C. at which temperature it was held with constant stirring for 8 hours. After the reaction was complete, an excellent yield of di(butyl glycolyl) γ-oxy-dibutyrate was recovered and purified in the manner described in Example I.

EXAMPLE III

Di(2-ethylhexyl glycolyl) γ-oxy-dibutyrate

As in Example I, 234 g. of disodium γ-oxy-dibutyrate was added with stirring to a mixture of 433.7 g. of 2-ethylhexyl chloroacetate and 2.0 ml. of dimethyl cyclohexylamine at 100° to 110° C. The reaction mass was heated at 140° to 170° C. for 10 hours. After the reaction was complete, the di(2-ethylhexyl glycolyl) γ-oxy-dibutyrate was recovered.

EXAMPLE IV

Di(butoxyethyl glycolyl) diglycolate

As was described in Example I, 71.2 g. of disodium diglycolate was added at 115° C. with stirring to a reaction vessel containing 165.2 g. of butoxyethyl chloroacetate and 1.0 ml. of triethylamine. After all of the reactants had been added, the reaction mass was heated for 12 hours at 160° to 170° C., after which time di(butoxyethyl glycolyl) diglycolate was recovered.

EXAMPLE V

Di(butoxyethyl glycolyl) γ-oxy-dibutyrate 117 g. of disodium γ-oxy-dibutyrate was added with continuous stirring and at a temperature of about 110° C. to 204.2 g. of butoxyethyl chloroacetate and 1.0 ml. of triethylamine. The reaction was carried out as was described in Example I, and after the reaction was complete, di(butoxyethyl glycolyl) γ-oxy-dibutyrate was recovered.

EXAMPLE VI

Di(2-ethylhexoxyethyl glycolyl) γ-oxy-dibutyrate 266.2 g. of dipotassium γ-oxy-dibutyrate was added to a reaction vessel containing 426 g. of 2-ethylhexoxyethyl chloroacetate and 2.0 ml. of triethylamine at 110° C. With constant agitation, the reaction mass was heated for 5 hours at 140° to 150° C. After the reaction was complete, di(2-ethylhexoxyethyl glycolyl) γ-oxy-dibutyrate was recovered in the manner described in Example I.

The outstanding utility of the novel compounds of this invention is illustrated by preparing a composition containing about 60 parts by weight of a polyvinyl chloride resin formed by the polymerization of vinyl chloride, 38 parts by weight of di(butyl glycolyl) diglycolate and 2 parts by weight of a basic lead silicate stabilizer. The resin, plasticizer and stabilizer are intimately mixed and fluxed on a differential steel roll mill for about 5 minutes at about 160° C. When a homogeneous composition has been formed on the roll, the plasticized polyvinyl chloride is sheeted off the roll mill. This composition is then moulded into a 5" by 5" by .040" sheet under a pressure of 2,000 lbs. per square inch at a temperature of about 160° C. Such a prepared composition is clear, substantially colorless, free from odor and exceptionally flexible at low temperatures. The degree of flexibility of such compositions may be varied as desired by merely varying the plasticizer content in such a composition. Typical of the wide variety of applications in which such compositions would find outstanding utility are calendered films and sheeting for wearing apparent, shower curtains and seat cushion coverings, and extruded insulation for electrical wiring.

What is claimed is:

1. As new chemical compounds, the di(alkyl glycolyl) esters of oxy-di(polymethylene)-dicarboxylic acids having the formula

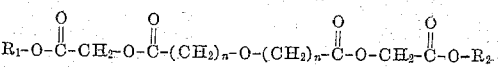

wherein $R_1$ and $R_2$ are selected from the group consisting of alkyl radicals having at least 1 and not more than 18 carbon atoms, and alkoxyethyl radicals wherein the alkyl substituent contains at least 1 and not more than 12 carbon atoms, and $n$ is a whole number from 1 to 3 inclusive.

2. As a new chemical compound, di(butyl glycolyl) diglycolate.

3. As a new chemical compound, di(2-ethylhexyl glycolyl) γ-oxy-dibutyrate.

4. As a new chemical compound, di(butoxyethyl glycolyl) diglycolate.

5. A process for the preparation of a di(alkyl glycolyl) ester of an oxy-di(polymethylene)-dicarboxylic acid having the formula

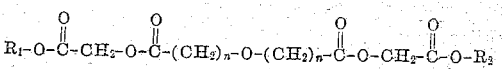

wherein $R_1$ and $R_2$ are selected from the group consisting of alkyl radicals having at least 1 and not more than 18 carbon atoms, and alkoxyethyl radicals wherein the alkyl substituent contains at least 1 and not more than 12 carbon atoms, and $n$ is a whole number from 1 to 3 inclusive, comprising reacting approximately 2 molecular proportions of a compound selected from the group consisting of alkyl chloroacetates wherein the alkyl substituent contains at least 1 and not more than 18 carbon atoms, alkoxyethyl chloroacetates wherein the alkyl substituent contains from 1 to 12 carbon atoms, and mixtures of said alkyl chloroacetates and alkoxyethyl chloroacetates, with a 1 molecular proportion of a di(alkali metal) salt of an oxy-di(polymethylene)-dicarboxylic acid having the formula

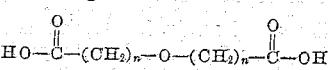

wherein $n$ is a whole number from 1 to 3 inclusive, at a maximum temperature of about 200° C., and recovering therefrom said di(alkyl glycolyl) ester of an oxy-di(polymethylene)-dicarboxylic acid.

6. The process as described in claim 5 wherein the alkyl chloroacetate is butyl chloroacetate and the di(alkali metal) salt of an oxy-di(polymethylene)-dicarboxylic acid is a di(alkali metal) salt of diglycolic acid.

7. The process as described in claim 5 wherein the alkyl chloroacetate is 2-ethylhexyl chloroacetate and the di(alkali metal) sale of an oxy-di(polymethylene)-dicarboxylic acid is a di(alkali metal) salt of γ-oxy-dibutyric acid.

8. The process as described in claim 5 wherein the alkyl chloroacetate is butoxyethyl chloroacetate and the di(alkali metal) salt of an oxy-di(polymethylene)-dicarboxylic acid is a di(alkali metal) salt of diglycolic acid.

WILLIAM E. WEESNER.

REFERENCES CITED

The following references are of record in the file of this patent:

UNITED STATES PATENTS

| Number | Name | Date |
|---|---|---|
| 2,260,295 | Carruthers | Oct. 28, 1941 |
| 2,379,251 | Muskat | June 26, 1945 |